United States Patent
Uchiyama et al.

(10) Patent No.: US 7,261,538 B2
(45) Date of Patent: Aug. 28, 2007

(54) MONITORING DEVICE FOR AN INJECTION MOLDING MACHINE

(75) Inventors: Tatsuhiro Uchiyama, Gotenba (JP); Akimasa Matsuo, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 530 days.

(21) Appl. No.: 10/784,176

(22) Filed: Feb. 24, 2004

(65) Prior Publication Data

US 2004/0166188 A1     Aug. 26, 2004

(30) Foreign Application Priority Data

Feb. 24, 2003 (JP) ............................. 2003-046199

(51) Int. Cl.
    *B29C 45/77* (2006.01)
(52) U.S. Cl. ..................... 425/143; 264/40.6; 425/144
(58) Field of Classification Search ................ 425/143, 425/144; 264/40.6
    See application file for complete search history.

(56) References Cited

U.S. PATENT DOCUMENTS 5,456,870 A * 10/1995 Bulgrin ..................... 264/40.6
5,792,395 A    8/1998 Ito et al.

FOREIGN PATENT DOCUMENTS

| EP | 0 727 297    | 8/1996  |
|----|--------------|---------|
| JP | 6-297532     | 10/1994 |
| JP | 06-297532    | 10/1994 |
| JP | 7-32430      | 2/1995  |
| JP | 10-058506    | 3/1998  |
| JP | 2001-225372  | 8/2001  |
| JP | 2001-260193  | 9/2001  |
| JP | 2001-287255  | 10/2001 |

OTHER PUBLICATIONS

EP Search Report for corresponding EP Application No. EP 04 25 1005 mailed May 24, 2004.

* cited by examiner

*Primary Examiner*—Tim Heitbrink
(74) *Attorney, Agent, or Firm*—Staas & Halsey LLP

(57) ABSTRACT

A monitoring device for an injection molding machine whereby the state of resin sheared by a rotating screw can be easily monitored. During the period from the start to end of metering process, the rate of heat generated by a heater for heating an injection cylinder is obtained by multiplying an on/off ratio B of the heater by a coefficient K and stored in a memory location THmem(n). Also, a time elapsed from the start of the metering is obtained by adding up a processing period T and stored in a memory location Tim(n). The heat generation rates of the heater stored in memory and corresponding to the respective elapsed times are displayed in graph form. The temperature of the injection cylinder represents heat generated by the heater plus heat generated due to resin shearing. Since the heat generation rate of the heater is detected, the rate of heat generated due to resin shearing can be grasped relatively from the detected heat generation rate, making it possible to monitor the state of the resin sheared by the rotating screw. The resin shearing state can be monitored by simple processing of detecting and displaying the heat generation rate of the heater.

20 Claims, 7 Drawing Sheets

| INDEX | THmem(n) | ScP(n) |
|---|---|---|
| 1 | THmem(1) | ScP(1) |
| 2 | THmem(2) | ScP(2) |
| ... | ... | ... |
| N−1 | THmem(N−1) | ScP(N−1) |
| N | THmem(N) | ScP(N) |

Te2

MONITORING DEVICE FOR AN INJECTION MOLDING MACHINE

BACKGROUND OF THE INVENTION

1. Field of the Invention

The present invention relates to a monitoring device for an injection molding machine, and more particularly, to a monitoring device capable of monitoring heat generated due to shearing of resin.

2. Description of Related Art

In metering process of an injection molding machine, an injection cylinder is heated by a heater and metering is carried out by retracting a screw while at the same time rotating the screw to plasticize, melt, and knead resin in the injection cylinder. At this time, resin pellets are plasticized and melted by shearing heat generated due to shearing of the resin pellets by the rotating screw as well as by heat generated by the heater.

Resins used for optical components such as lenses, however, are deteriorated by shearing. It is therefore desirable that certain kinds of resins should be melted by heat generated by the heater.

When resin is sheared, plasticized, and melted by rotating the screw, the shearing and plasticization of the resin act upon the screw as a load and thus can be estimated from the magnitude of driving torque of a motor etc. for rotating the screw. There has been known a product quality determination method wherein the driving torque of the motor for rotating the screw is monitored and if the driving torque deviates from a preset allowable range, the deviation is detected as metering abnormality (see, for example, JP 06-297532A).

Also, there has been proposed a control method wherein a torque model for the metering motor, according to which a non-defective product could be produced, is obtained in advance and the current supply to the heater for heating the heating cylinder is controlled such that the metering motor torque approaches the torque model (see, for example, JP 2001-260193A).

Further, a method is known wherein the correspondence between heat generation by the heater, calculated from the value of current supplied to the heater and the current supply time without rotating the screw in the heating cylinder filled with resin, and the temperature of the heating cylinder detected by a temperature sensor is stored in advance as a reference. During actual molding, the temperature of the heating cylinder is detected at sampling periods while the quantity of heat generated by the heater is calculated, and based on the calculated quantity of heat, a difference (or ratio) between the stored reference and the detected cylinder temperature is calculated as a temperature rise attributable to shearing heat generated by the screw rotation (see, for example, JP 2001-225372A).

There has also been proposed a control method in which a screw back pressure model for metering, according to which a non-defective product could be produced, is obtained in advance and also a ratio model of the screw back pressure model, which indicates the ratio of the quantity of heat generated by the heater to the quantity of shearing heat, is obtained. During actual molding, the current supply to the heater for heating the heating cylinder is controlled such that the screw back pressure approaches the screw back pressure model, and at the same time the temperature of the heating cylinder is controlled such that the heat quantity ratio approaches the ratio model (see, for example, JP 2001-287255A).

The driving torque of the motor etc. for rotating the screw represents not only the load applied by the shearing of the resin but other loads. Thus, although the load applied to the screw as a whole can be monitored in terms of the driving torque, it is not possible to extract and monitor only the load applied by the shearing of the resin being melted.

Also, according to the aforementioned techniques disclosed in JP 2001-225372A and JP 2001-287255A in which the influence of screw rotation on shearing is detected, it is necessary to measure and store in advance the correspondence between heat generation by the heater, calculated from the value of current supplied to the heater and the current supply time without rotating the screw in the heating cylinder filled with resin, and the temperature of the heating cylinder detected by the temperature sensor. Thus, resin must be filled in the heating cylinder without rotating the screw, which makes it difficult to measure and store, as a reference, the correspondence between the heat generation by the heater and the temperature of the heating cylinder detected by the temperature sensor.

SUMMARY OF THE INVENTION

The present invention provides a monitoring device for an injection molding machine capable of monitoring a state of resin sheared by rotation of a screw with ease.

A monitoring device of the present invention is applied to an injection molding machine in which a metering process is performed by retraction of a screw by rotating the screw to knead resin in an injection cylinder while controlling temperature of the injection cylinder heated by a heater to be a set temperature. According to one aspect of the present invention, a monitoring device comprises: detecting means for detecting a rate of heat generation per unit time by the heater in the metering process; storing means for storing the rate of heat generation by the heater with elapsing time in the metering process; and display means for displaying the stored rate of heat generation by the heater with the elapsing time in the metering process in a form of a graph. With the above arrangement, a heat generation by shearing of resin can be estimated on the basis of the rate of heat generation by the heater displayed in the form of a graph, to thus enable monitoring of the resin shearing state.

According to another aspect of the present invention, the monitoring device comprises: detecting means for detecting a rate of heat generation per unit time by the heater in the metering process; storing means for storing the rate of heat generation by the heater with position of the screw in the metering process; and display means for displaying the stored rate of heat generation by the heater with the position of the screw in the metering process in a form of graph. With the above arrangement, a heat generation by shearing of resin at respective positions of the screw can be estimated on the basis of the rate of heat generation by the heater displayed in graph form, to thus enable monitoring of the resin shearing state.

According to still another aspect of the present invention, the monitoring device comprises: detecting means for detecting a rate of heat generation per unit time by the heater in the metering process; storing means for storing the rate of heat generation of the heater with elapsing time in the metering process; setting means for setting an allowable range of the rate of heat generation by the heater in a determination section in the metering process; and determination means for determining an abnormality of the metering process when the rate of heat generation by the heater deviates from the allowable range in the determination section. In this case, the setting means may set the determination section in terms of the elapsing time, and the determination means may determine an abnormality of the metering if the rate of heat generation by the heater deviates from the allowable range in the determination section of the elapsing time.

According to yet another aspect of the present invention, the monitoring device comprises: detecting means for detecting a rate of heat generation per unit time by the heater in the metering process; storing means for storing the rate of heat generation by the heater with position of the screw in the metering process; setting means for setting an allowable range for the rate of heat generation by the heater in a determination section of the metering process; and determining means for determining abnormality of metering if the rate of heat generation by the heater deviates from the allowable range in the determination section. In this case, the setting means may set the determination section in terms of screw position and the determining means determines an abnormality of metering if the rate of heat generation by the heater deviates from the allowable range in the determination section of the screw position.

According to a further aspect of the present invention, the monitoring device comprises: detecting means for detecting a rate of heat generation per unit time by the heater in the metering process; storing means for storing the rate of heat generation by the heater with elapsing time or position of the screw in the metering process; calculation means for calculating an average value of the rate of heat generation by the heater in the metering process; and setting means for setting an allowable range of the rate of heat generation by the heater; determination means for determining an abnormality of metering if the average value of the rate of heat generation by the heater deviates from the allowable range.

The detecting means may detect the rate of heat generation by the heater based on ON time period of the heater per unit time, or based on electric power supplied to the heater per unit time.

DETAILED DESCRIPTION

Figure 1:
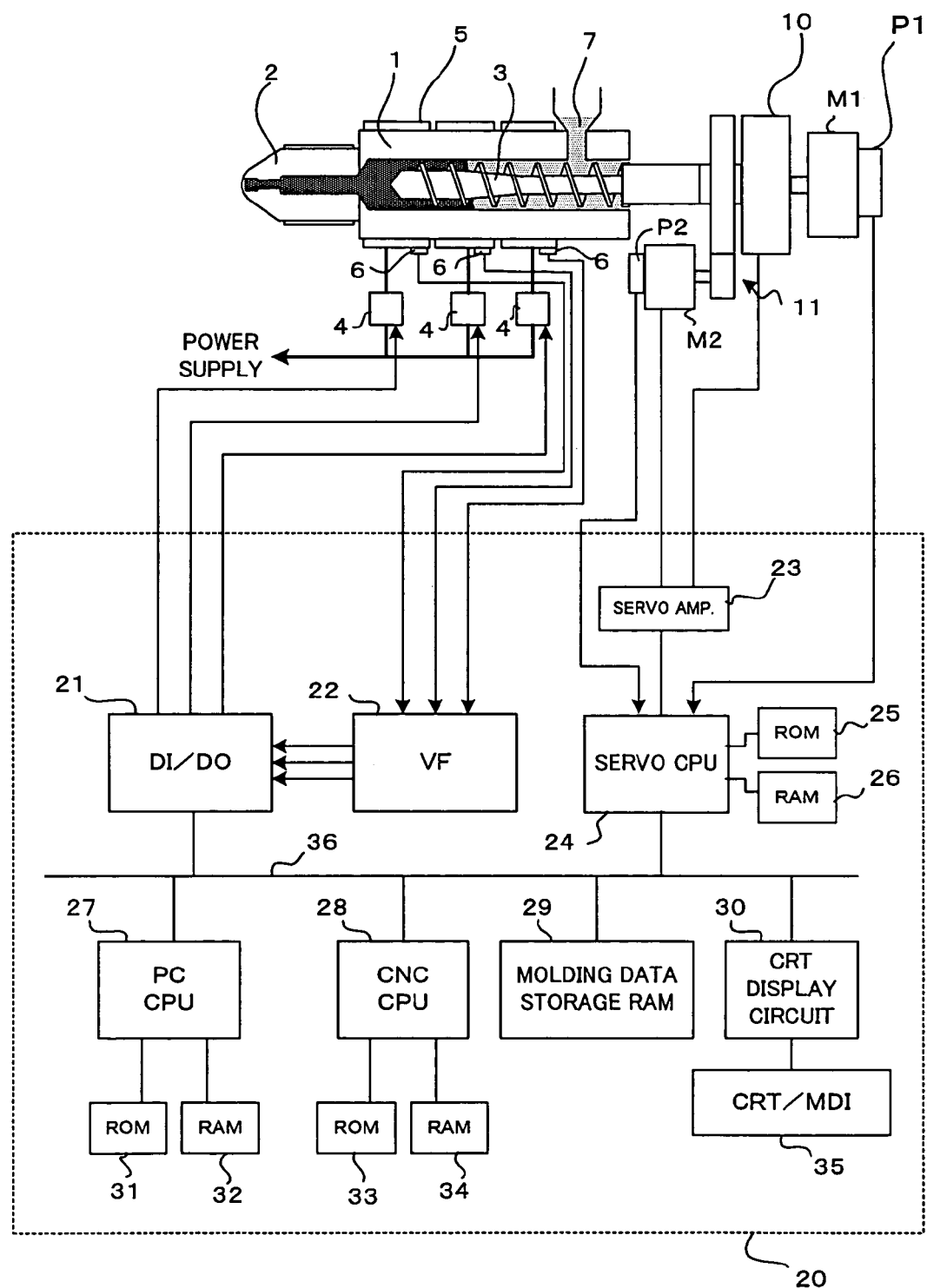
FIG. 1 is a block diagram of a principal part according to one embodiment of the present invention.

FIG. 1 is a block diagram showing a principal part of a monitoring device for an injection molding machine according to one embodiment of the present invention. Reference numerals 1, 2 and 3 respectively denote an injection cylinder, nozzle, and screw of the injection molding machine. The screw 3 is driven in an axial direction thereof by an injection servomotor M1 through a drive conversion unit 10 for converting rotation of the drive source to linear motion along the axis of injection. Also, the screw 3 is rotated by a screw rotation servomotor M2 through a transmission mechanism 11 such as a gear assembly. The injection servomotor M1 is provided with an encoder P1 for detecting the position and moving speed of the screw 3, and the screw rotation servomotor M2 is provided with a speed detector P2 for detecting the rotating speed of the screw 3.

The injection cylinder 1 has heaters 5 fitted on respective heater zones, and the supply of electric power from a power supply to the heaters 5 is controlled by switching on and off respective switches 4. Also, a temperature sensor 6 is attached to each heater 5 and a detection signal thereof is input to a controller 20. Reference numeral 7 denotes a hopper for supplying resin pellets to the injection cylinder 1.

The controller 20 of the injection molding machine comprises a CNC CPU 28, which is a microprocessor for numerical control, a PC CPU 27, which is microprocessor for a programmable controller, a servo CPU 24, which is a microprocessor for servo control, an input/output circuit 21, a RAM 29 for storing molding data, and a CRT display circuit 30, all interconnected by a bus 36.

The PC CPU 27 is connected with a ROM 31 storing a sequence program for controlling sequential operation of the injection molding machine, a control program for determining plasticization abnormality caused during metering, etc., as well as with a RAM 32 for temporarily storing operation data etc. The CNC CPU 28 is connected with a ROM 33 storing a program for globally controlling the injection molding machine, etc., as well as with a RAM 34 for temporarily storing operation data etc.

The servo CPU 24 is connected with a ROM 25 storing control programs used exclusively for servo control, as well as with a RAM 26 for temporarily storing data. Further, the servo CPU 24 is connected with a servo amplifier 23 for driving the servomotors of respective axes, such as the injection axis and the screw rotation axis, in accordance with commands from the CPU 24. Also, the outputs of the encoders P1 and P2 attached to the injection servomotor M1 and the screw rotation servomotor M2, respectively, are fed back to the servo CPU 24. Namely, the servo CPU 24 performs feedback control on the position and speed of the screw 3 as well as feedback control on the rotating speed of the screw 3. Also, current position of the screw 3, obtained based on feedback pulses from the encoder P1, is stored in a current position storage register.

The input/output circuit 21 is generally used for receiving signals from limit switches etc. arranged in various parts of the injection molding machine and for transmitting various commands to peripheral devices etc. of the molding machine. In connection with the present invention, the input/output circuit 21 is adapted to output on/off signals to the switches 4 for supplying electric power to the respective heaters 5. Also, the signals from the temperature sensors 6 attached to the respective heaters 5 are each converted to frequency by a VF (voltage/frequency) converter 22 and input to the input/output circuit 21 so that the temperature of each heater zone can be detected by counting the frequency. A manual data input device with a display, 35, is connected through the CRT display circuit 30 to the bus 36 so that selection of a monitor display screen or function menu, entry of various data, etc. can be performed via the input device 35. To this end, the input device 35 is provided with a numeric keypad for numerical data entry as well as various function keys. In this embodiment, a CRT device is used as the display device but some other display device, such as a liquid crystal display device, may be used instead.

The molding data storage RAM 29, which comprises a nonvolatile RAM, stores molding conditions (injection/dwell conditions, metering conditions, etc.) and various set values related to injection molding operation, parameters, macro variables, as well as determination sections, allowable ranges, etc. for detecting metering abnormality.

The PC CPU 27 acquires, through the voltage/frequency converter 22 and the input/output circuit 21, the temperatures of the respective heater zones detected by the temperature sensors 6 and performs PID (proportional-plus-integral-plus-derivative) control or the like to control the temperatures through on/off control of the switches 4 via the input/output circuit 21, as in conventional machines.

Figure 2:
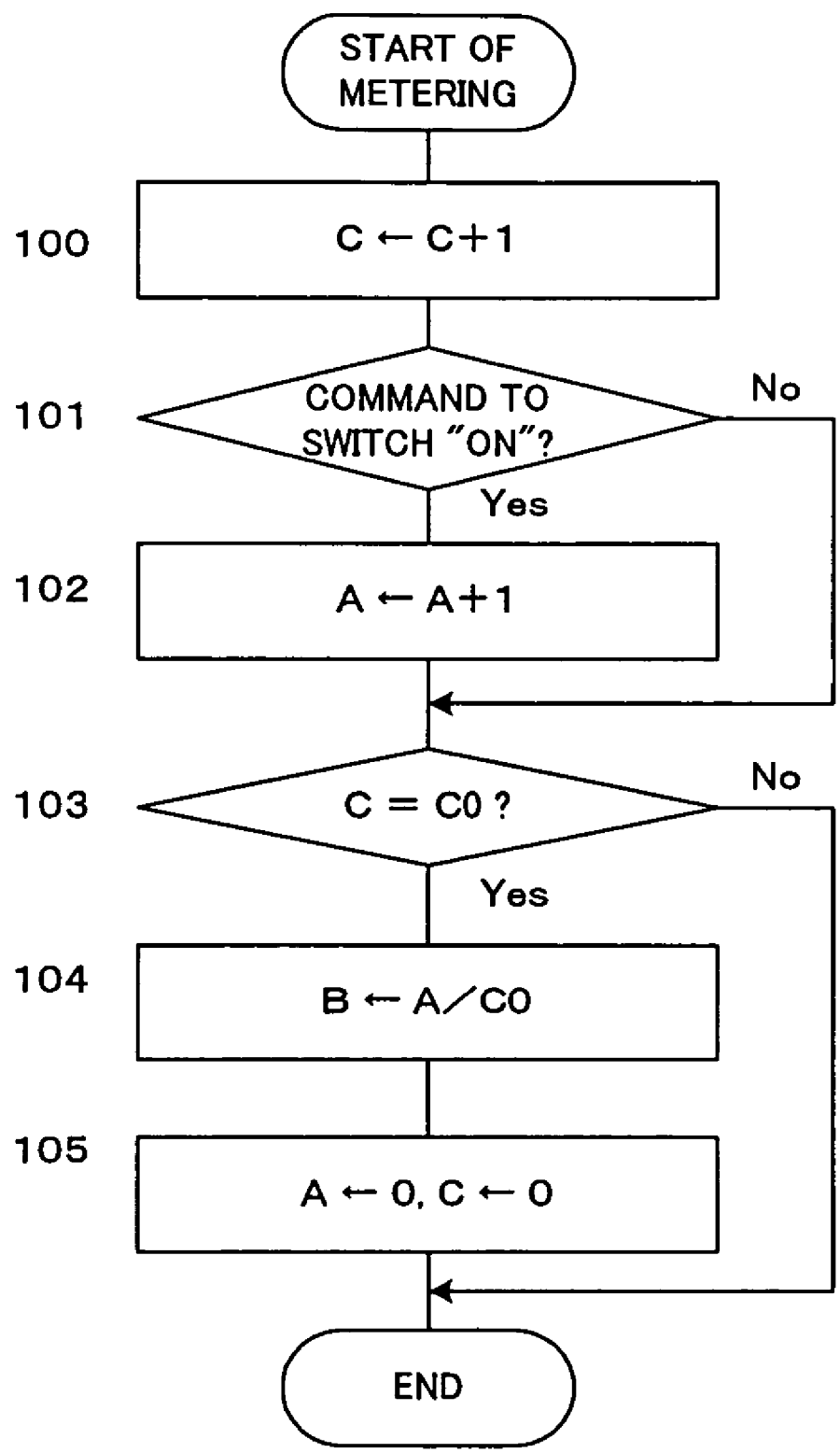
FIG. 2 is a flowchart showing a heat generation rate detection process according to the embodiment.

FIG. 2 shows a heat generation rate detection processing according to the invention, which is executed at predetermined periods by the PC CPU 27 for each of the heaters. In the following description, the processing of detecting a rate of heat generated by one heater is explained for the sake of simplicity. It is to be noted, however, that the heat generation rate of each heater is detected and stored.

First, a counter C is incrementally increased by "1" (Step 100), and it is determined whether or not a command output from the input/output circuit to the switch 4 is "ON" (Step 101). If the command is "ON", "1" is added to a register A (Step 102), and if the command is not "ON", the procedure proceeds to Step 103 without the addition. The counter C and the register A have been cleared to "0" by initialization at the start of power supply.

In Step 103, it is determined whether or not the value of the counter C has reached a set value C0, and if the set value is not reached yet, the procedure of the present processing period is terminated. If the value of the counter C is equal to the set value C0, the value of the register A is divided by the set value C0 to determine whether or not the command has been set ON a number of times equal to the set value C0, and obtains a ratio of the ON commands to the detection count, which is stored in a register B (Step 104). Then, the register A and the counter C are cleared to "0" (Step 105), followed by termination of the processing for the current period.

According to the aforementioned processing, each time the number of processing periods reaches the set value C0, the ON ratio is calculated and stored in the register B. The ON ratio is multiplied by a predetermined proportional coefficient, whereby a quantity of heat generation per unit time, i.e. a rate of heat generation by the heater is obtained.

Figures 3, 4:
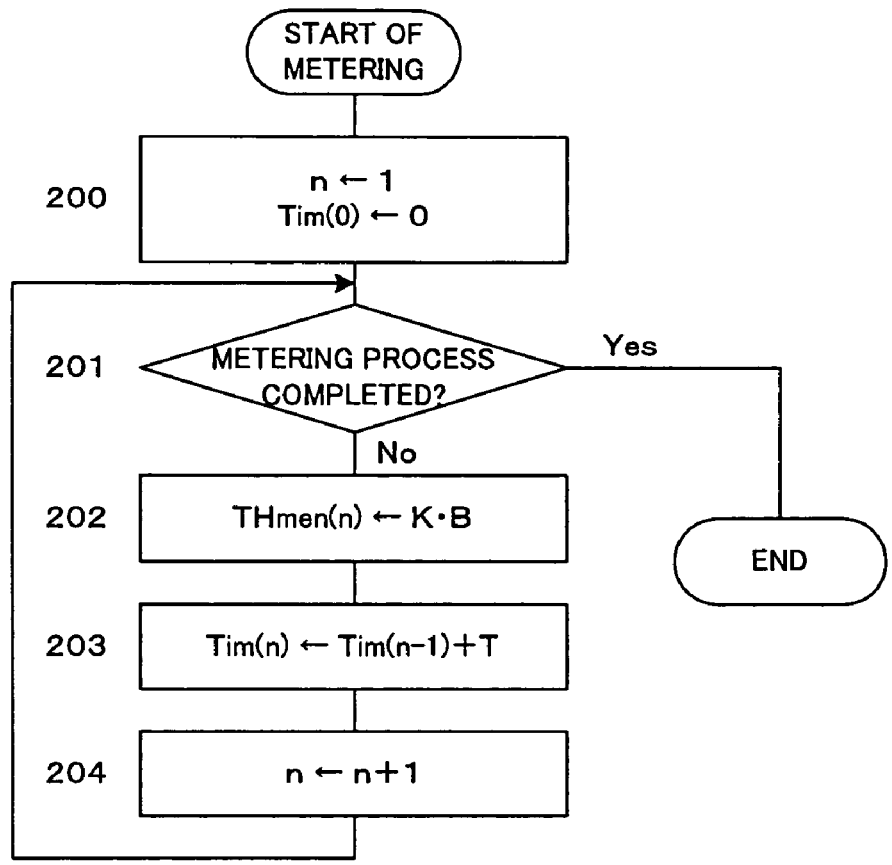
FIG. 3 is a flowchart showing a metering monitoring process according to a first embodiment of the invention.
FIG. 4 is a diagram illustrating a table for storing data acquired according to the first embodiment of the invention.

FIG. 3 is a flowchart showing monitoring processing executed during the metering process according to a first embodiment of the invention, and FIG. 4 is a diagram illustrating a table Te1 which is provided in the molding data storage RAM 29 for storing data acquired in the processing shown in FIG. 3.

First, an index n, which stores time elapsed from the start of metering, is set to "1", and "0" is stored in a memory location Tim(0) corresponding to the index n=0 (Step 200). It is then determined whether or not the metering process is completed (Step 201). If the metering process is not completed, the ON ratio of the switch 4 stored in the register B is multiplied by a predetermined proportional coefficient K to obtain a heat generation rate (K·B) of the heater 5, and the obtained heat generation rate is stored in a memory location THmem(n) of the table Te1 corresponding to the index n (Step 202). Also, the period T of the processing shown in FIG. 3 is added to the value stored in a memory location Tim(n−1) to obtain a time elapsed from the start of the metering, and the sum obtained is stored in a memory location Tim(n) of the table Te1 specified by the index n (Step 203). Subsequently, the index n is incremented by "1" (Step 204) and the procedure returns to Step 201. Step 201 and the subsequent Steps are thereafter repeatedly executed at the predetermined periods until the metering process is completed. The processing period is equal to the time interval at which the ON ratio of the switch 4 is obtained in the processing shown in FIG. 2, or to an integer multiple of the same time interval. Namely, the processing period is equal to the time interval (processing period of FIG. 2×C0) or to an integer multiple of this time interval.

In this manner, Step 201 and the following steps are repeatedly executed, and by the time the metering process is finished, the times Tim(n) elapsed from the start of the metering and the heat generation rates THmem(n) of the heater obtained at the respective times are stored in the table Te1 in association with the index n, as shown in FIG. 4. Instead of storing the times Tim(n) elapsed from the start of metering, the processing period may be multiplied by the index n to obtain times elapsed from the start of metering.

The processing shown in FIG. 3 is executed for each of the heaters and also the table Te1 is provided for each heater. Each time the metering process is carried out thereafter, the tables Te1 are updated and the heat generation rates of the individual heaters are obtained. Where the CRT/MDI 35 is operated to input a command to display the heat generation rates of a certain heater, the heat generation rates of the heater stored in the corresponding table Te1 are displayed in graph form in a manner associated with the time elapsed from the start of the metering process.

Figure 8:
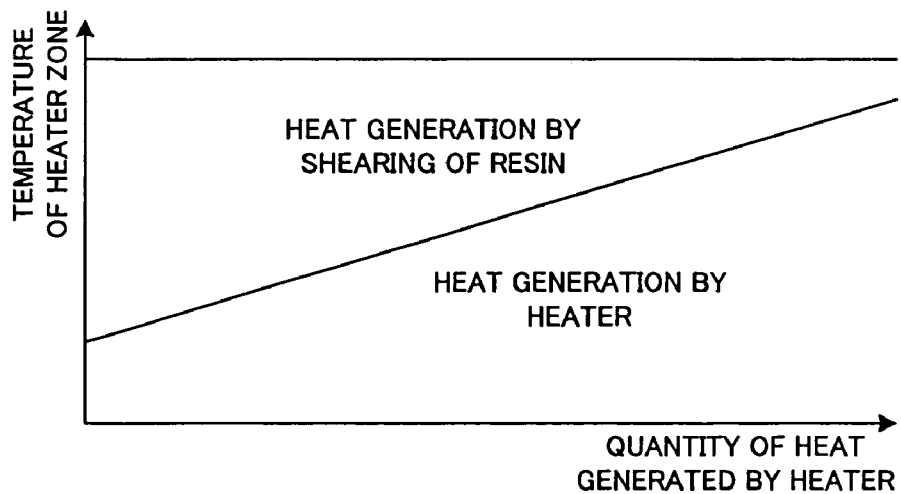
FIG. 8 is a diagram illustrating the relationship between heat generated by a heater and heat generated due to resin shearing with respect to heater zone temperature.

The temperature of each heater zone represents heat generated by the corresponding heater plus heat generated due to resin shearing. Accordingly, provided the temperature of the heater zone is controlled to be constant, as shown in FIG. 8, the more heat generated by the heater, the less heat is generated due to resin shearing. Thus, the rate of heat generated due to resin shearing can be grasped relatively from the heat generation rates of the heater displayed in graph form, making it possible to monitor the state of resin sheared by the screw 3. Further, in the case where the heat generation rates of the heater are displayed in graph form, upper and lower limits defining an allowable range may be set in advance with the use of the CRT/MDI 35 to display the upper and lower limits as well so that abnormality of metering process can also be determined.

Figures 5, 6:
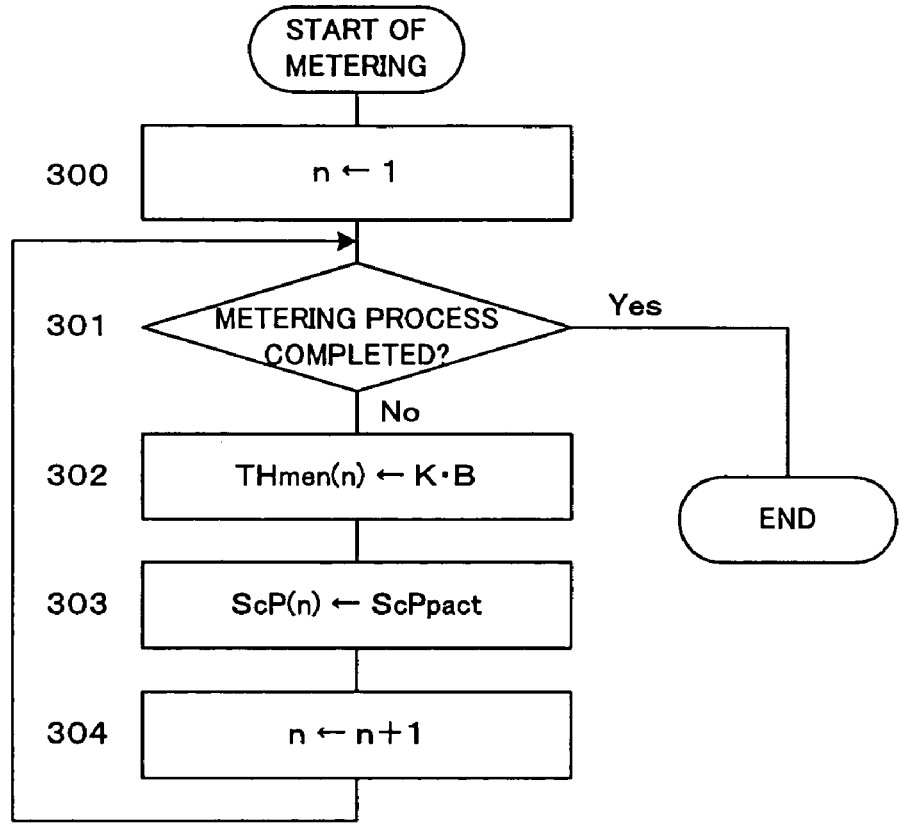
FIG. 5 is a flowchart showing a metering monitoring process according to a second embodiment of the invention.
FIG. 6 is a diagram illustrating a table for storing data acquired according to the second embodiment of the invention.

FIG. 5 illustrates a second embodiment of the present invention. The second embodiment differs from the first embodiment in that the heat generation rate of each heater is detected and displayed in association with the position of the screw 3. FIG. 6 is a diagram illustrating a table Te2 provided in the molding data storage RAM 29 for storing data acquired in processing shown in FIG. 5. First, the index n is set to "1" and a flag E is set to "0" (Step 300) by initialization at the start of metering. Then, Step 301 and the following Steps are repeatedly executed at predetermined periods of time, each period being equal to the time interval at which the ON ratio is obtained in the processing shown in FIG. 2 or to an integer multiple of the same time interval. Specifically, it is determined whether or not the metering process is completed (Step 301). If the metering process is not completed, the ON ratio of the switch 4 stored in the register B is multiplied by the predetermined proportional coefficient K to obtain a heat generation rate (K·B) of the heater 5, and the obtained heat generation rate is stored in a memory location THmem(n) of the table Te2 corresponding to the index n (Step 302). Then, the position ScPpact of the screw 3, which has been obtained by the servo CPU 24 on the basis of the position feedback signal from the encoder P1 and is stored in the current position storage register, is read out and stored in a memory location ScP(n) specified by the index n (Step 303), and the index n is incremented by "1" (Step 304), whereupon the procedure returns to Step 301. Step 301 and the following steps are thereafter repeatedly executed at the predetermined periods until the metering process is completed.

Figure 9:
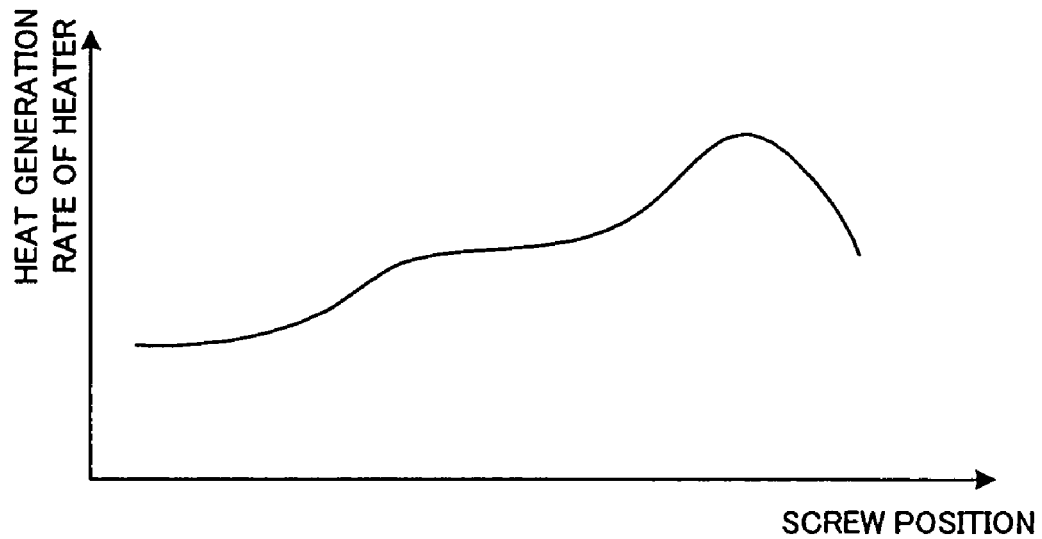
FIG. 9 is a diagram exemplifying a graph displayed according to the second embodiment to show the heat generation rate of the heater in association with screw position.
Figure 11A:
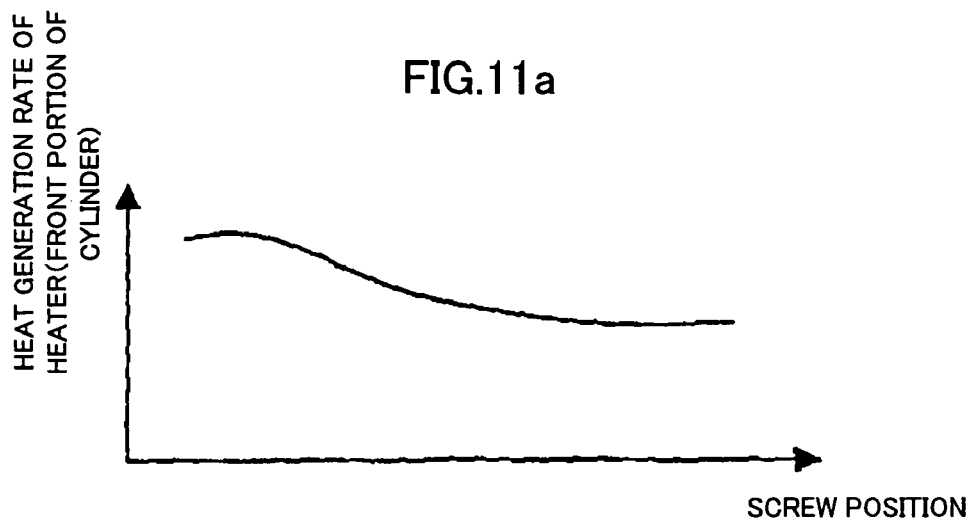
FIGS. 11a-11c are diagrams exemplifying graphs displayed simultaneously to show heat generation rates of a plurality of heater zones.
Figure 11B:
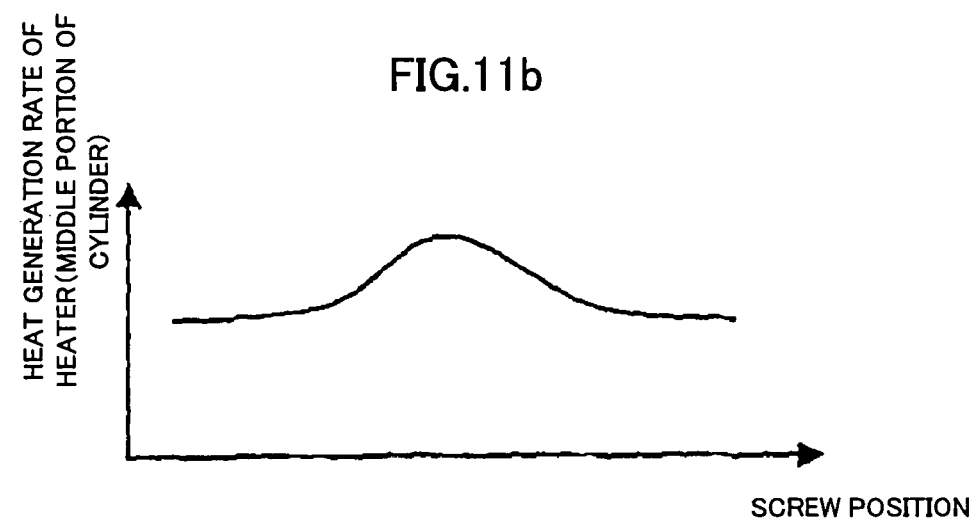
Figure 11C:
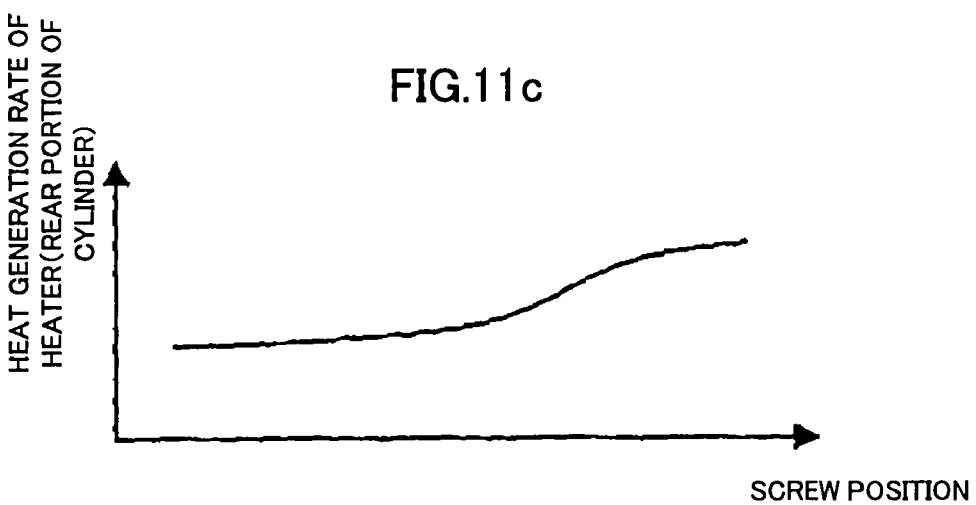

Thus, by the time the metering process is finished, the screw positions are stored in the memory locations ScP(n) of the table Te2 in association with the index n, and also the heat generation rates of the heater obtained at the respective screw positions are stored in the memory locations THmem (n), as shown in FIG. 6.

Where the CRT/MDI 35 is operated to input a command to display the heat generation rates of a certain heater, the heat generation rates of the heater stored in the corresponding table Te2 are displayed in graph form in a manner associated with the screw position, as shown in FIG. 9. Instead of displaying a graph of the heat generation rates of a specified heater zone, the heat generation rates of a plurality of heater zones may be simultaneously displayed, as shown in FIGS. 11a-11c.

Figure 10:
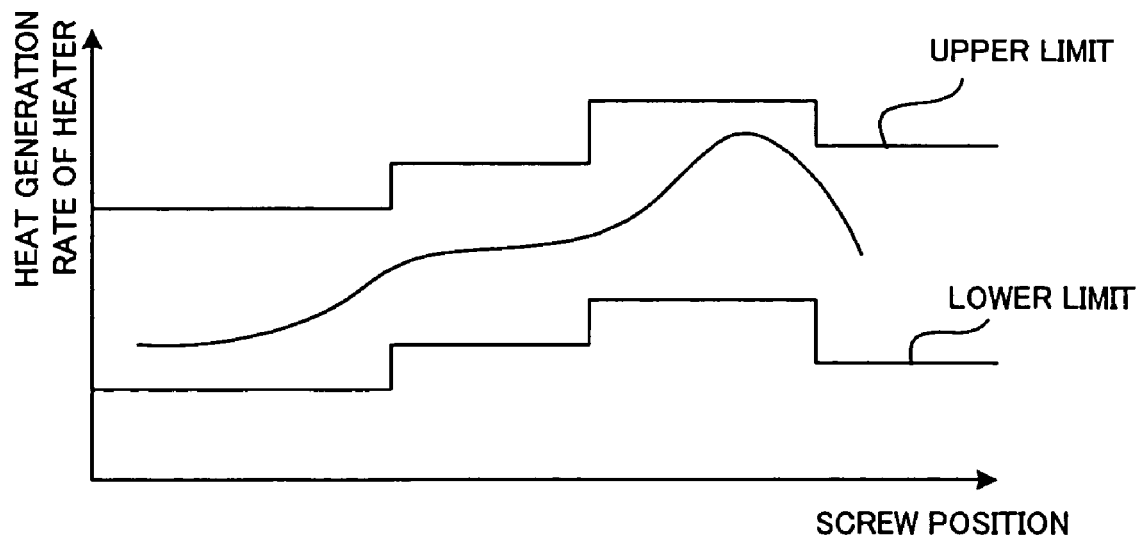
FIG. 10 is a diagram exemplifying a graph displayed to show the heat generation rate of the heater in association with the screw position, along with preset upper and lower limits.

When displaying the graph or graphs in this manner, upper and lower limits defining allowable ranges, which are set beforehand for respective screw positions with the use of the CRT/MDI 35, may be displayed at the same time, as shown in FIG. 10, whereby abnormality of metering process can also be determined.

Figure 7:
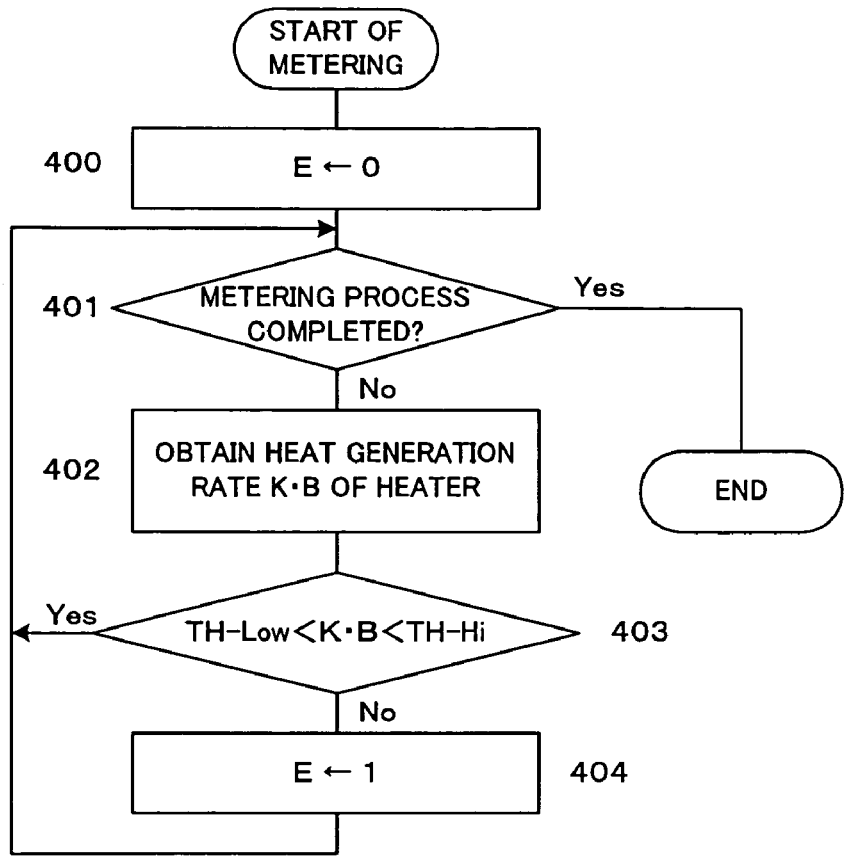
FIG. 7 is a flowchart showing a metering monitoring process according to a third embodiment of the invention.

FIG. 7 illustrates a third embodiment of the present invention. In the third embodiment, the heat generation rates of each heater are not displayed in graph form, and metering abnormality is directly detected from the heat generation rate. In this embodiment, upper and lower limits TH-Hi and TH-Low defining an allowable range are set in advance with the use of the CRT/MDI 35.

First, a flag E is reset to "0" by initialization at the start of metering (Step 400), and then Step 401 and the following Steps are repeatedly executed at predetermined periods of time, each period being equal to the time interval at which the ON ratio is obtained in the processing shown in FIG. 2 or to an integer multiple of the same time interval. Specifically, it is determined whether or not the metering process is completed (Step 401). Therefore, if the metering process is not completed, the ON ratio of the switch 4 stored in the register B is multiplied by the predetermined proportional coefficient K to obtain a heat generation rate K·B of the heater 5 (Step 402), and it is determined whether or not the heat generation rate K·B falls within the range between the lower limit TH-Low and the upper limit TH-Hi (Step 403). If the heat generation rate is within the allowable range, the procedure returns to Step 401. On the other hand, if the heat generation rate is outside the allowable range, the flag E is set to "1" to indicate metering abnormality (Step 404), whereupon the procedure returns to Step 401. Step 401 and the following Steps are thereafter repeatedly executed at the predetermined periods until the metering process is completed.

When the flag E is set to "1", a warning of metering abnormality is displayed, for example, to notify the operator of the metering abnormality, though not shown.

In the third embodiment, metering abnormality is merely detected on the basis of the heat generation rate of each heater, without displaying the heat generation rates in graph form. The third embodiment may, however, be combined with the aforementioned first or second embodiment so as to display a graph as well as to detect metering abnormality. In this case, the lower and upper limits TH-Low and TH-Hi are set beforehand, and steps are added following Step 202 in FIG. 3 or Step 302 in FIG. 5, to determine whether or not the heat generation rate K·B obtained in Step 202 or 302 falls within the range between the preset lower and upper limits TH-Low and TH-Hi, and to set the flag E to "1" if the heat generation rate is outside the range.

Further, a determination section in which metering abnormality is detected based on the heat generation rate of each heater may be set so that the determination as to metering abnormality may be made only within the determination section. In this case, Steps described below are inserted between Steps 203 and 204 in FIG. 3. Namely, it is determined whether or not the elapsed time (Tim(n)) is within the set determination period. If the elapsed time is outside the set determination period, the procedure proceeds directly to Step 204, and if the elapsed time is within the set determination period, it is determined whether or not the heat generation rate of the heater falls within the set allowable range, as in Step 403. If the heat generation rate is within the allowable range, the procedure proceeds to Step 204; if the heat generation rate is outside the allowable range, the flag E is set to "1" and the procedure proceeds to Step 204. Also, a plurality of determination periods may be provided and the allowable range may be set for each of the determination periods. In this case, if it is judged that the elapsed time is within one of the set determination periods, it is determined whether or not the heat generation rate of the heater falls within the allowable range set for this determination period.

The determination section can also be set in the second embodiment shown in FIG. 5. In this case, however, the determination section is set with respect to the screw position, as distinct from the case of setting the determination period in the first embodiment shown in FIG. 3, while the procedure to be followed is the same as that described above. Namely, Steps described below are inserted between Steps 303 and 304. It is determined whether or not the screw position (ScPpact) is within the set determination section, and if the screw position is within the set determination section, it is determined whether or not the heat generation rate of the heater falls within the allowable range set for this determination section. If the heat generation rate is outside the allowable range, the flag E is set to "1".

Also, the determination as to metering abnormality may be made based on an average value of the heat generation rates of each heater. In this case, after Step 202 in FIG. 3 or Step 302 in FIG. 5 is executed, the heat generation rate K·B of the heater, obtained in Step 202 or 302, is added to the value of an integration register, and after it is determined in Step 201 or 301 that the metering process is completed, the value stored in the integration register is divided by a value obtained by subtracting "1" from the index n, to obtain an average heat generation rate of the heater. It is then determined whether or not the average heat generation rate falls within the range between the set lower and upper limits TH-Low and TH-Hi, and if the average heat generation rate is outside the range, the flag E is set to "1". The average heat generation rate may also be displayed in graph form.

The aforementioned processing is performed with respect to each of the heater zones. The heat generation rates obtained for the individual heater zones may be summed up, and the determination as to metering abnormality may be made on the basis of the sum.

In the foregoing embodiments, the temperature control of the injection cylinder is carried out by controlling the heat generation by the heaters 5 through on/off control of the respective switches 4. It should, however, be noted that the present invention can also be applied to the case where the temperature of the injection cylinder is not controlled by the on/off control of the switches, but by electric power control, namely, by controlling the amounts of currents supplied to the heaters 5. In this case, the current flowing through each heater 5 is measured by a current sensor or the like, and the measured current value is acquired through the input/output circuit 21 and multiplied by a proportional constant (power supply voltage value) to obtain a heat generation rate of the heater. For example, in the flowchart of FIG. 3 or 5, Step 202 or 302 is replaced by the step of multiplying the detected current value by the proportional constant (power supply voltage value) to obtain the heat generation rate of the heater. In this case, the processing shown in FIG. 2 is unnecessary, and Step 201 and the following steps in FIG. 3 or Step 301 and the following steps in FIG. 5 should preferably be executed repeatedly at periods shorter that those explained above with reference to the first or second embodiment.

Thus, according to the present invention, the resin shearing state can be grasped by monitoring the heat generation rates of the respective heaters.

What is claimed is:

1. A monitoring device for an injection molding machine in which a metering process is performed by retraction of a screw by rotating the screw to knead resin in an injection cylinder while controlling temperature of the injection cylinder heated by a heater to be a set temperature, said monitoring device comprising:
    detecting means for detecting a rate of heat generation per unit time by the heater in the metering process;
    storing means for storing the rate of heat generation by the heater with elapsing time in the metering process; and
    display means for displaying the stored rate of heat generation by the heater with the elapsing time in the metering process in a form of a graph,
    whereby shearing heat of resin generated by the rotating screw in the metering process is monitored.

2. A monitoring device for an injection molding machine according to claim 1, wherein said detecting means detects the rate of heat generation by the heater based on ON time period of the heater per unit time.

3. A monitoring device for an injection molding machine according to claim 1, wherein said detecting means detects the rate of heat generation by the heater based on electric power supplied to the heater per unit time.

4. A monitoring device for an injection molding machine in which a metering process is performed by retraction of a screw by rotating the screw to knead resin in an injection cylinder while controlling temperature of the injection cylinder heated by a heater to coincide with a set temperature, said monitoring device comprising:
    detecting means for detecting a rate of heat generation per unit time by the heater in the metering process;
    storing means for storing the rate of heat generation by the heater with position of the screw in the metering process; and
    display means for displaying the stored rate of heat generation by the heater with the position of the screw in the metering process in a form of a graph,
    whereby shearing heat of resin generated by the rotating screw in the metering process is monitored.

5. A monitoring device for an injection molding machine according to claim 4, wherein said detecting means detects the rate of heat generation by the heater based on ON time period of the heater per unit time.

6. A monitoring device for an injection molding machine according to claim 4, wherein said detecting means detects the rate of heat generation by the heater based on electric power supplied to the heater per unit time.

7. A monitoring device for an injection molding machine in which a metering process is performed by retraction of a screw by rotating the screw to knead resin in an injection cylinder while controlling temperature of the injection cylinder heated by a heater to coincide with a set temperature, said monitoring device comprising:
    detecting means for detecting a rate of heat generation per unit time by the heater in the metering process;
    storing means for storing the rate of heat generation of the heater with elapsing time in the metering process;
    setting means for setting an allowable range of the rate of heat generation by the heater in a determination section in the metering process; and
    determination means for determining an abnormality of the metering process when the rate of heat generation by the heater deviates from the allowable range in the determination section.

8. A monitoring device for an injection molding machine according to claim 7 wherein said setting means sets the determination section in terms of the elapsing time, and said determination means determines an abnormality of the metering if the rate of heat generation by the heater deviates from the allowable range in the determination section of the elapsing time.

9. A monitoring device for an injection molding machine according to claim 7, wherein said detecting means detects the rate of heat generation by the heater based on ON time period of the heater per unit time.

10. A monitoring device for an injection molding machine according to claim 7, wherein said detecting means detects the rate of heat generation by the heater based on electric power supplied to the heater per unit time.

11. A monitoring device for an injection molding machine in which a metering process is performed by retraction of a screw by rotating the screw to knead resin in an injection cylinder while controlling temperature of the injection cylinder heated by a heater to coincide with a set temperature, said monitoring device comprising:
    detecting means for detecting a rate of heat generation per unit time by the heater in the metering process;
    storing means for storing the rate of heat generation by the heater with position of the screw in the metering process;
    setting means for setting an allowable range for the rate of heat generation by the heater in a determination section of the metering process; and
    determining means for determining abnormality of metering if the rate of heat generation by the heater deviates from the allowable range in the determination section.

12. A monitoring device for an injection molding machine according to claim 11, wherein said setting means sets the determination section in terms of screw position and said determining means determines an abnormality of metering if the rate of heat generation by the heater deviates from the allowable range in the determination section of the screw position.

13. A monitoring device for an injection molding machine according to claim 11, wherein said detecting means detects the rate of heat generation by the heater based on ON time period of the heater per unit time.

14. A monitoring device for an injection molding machine according to claim 11, wherein said detecting means detects the rate of heat generation by the heater based on electric power supplied to the heater per unit time.

15. A monitoring device for an injection molding machine in which a metering process is performed by retraction of a screw by rotating the screw to knead resin in an injection cylinder while controlling temperature of the injection cylinder heated by a heater, said monitoring device comprising:

detecting means for detecting a rate of heat generation per unit time by the heater in the metering process;

storing means for storing the rate of heat generation by the heater with elapsing time in the metering process;

calculation means for calculating an average value of the rate of heat generation by the heater in the metering process; and setting means for setting an allowable range of the rate of heat generation by the heater;

determination means for determining an abnormality of metering if the average value of the rate of heat generation by the heater deviates from the allowable range.

16. A monitoring device for an injection molding machine according to claim 15, wherein said detecting means detects the rate of heat generation by the heater based on ON time period of the heater per unit time.

17. A monitoring device for an injection molding machine according to claim 15, wherein said detecting means detects the rate of heat generation by the heater based on electric power supplied to the heater per unit time.

18. A monitoring device for an injection molding machine in which a metering process is performed by retraction of a screw by rotating the screw to knead resin in an injection cylinder while controlling temperature of the injection cylinder heated by a heater, said monitoring device comprising:

detecting means for detecting a rate of heat generation per unit time by the heater in the metering process;

storing means for storing the rate of heat generation by the heater with position of the screw in the metering process;

calculation means for calculating an average value of the rate of heat generation by the heater in the metering process;

setting means for setting an allowable range of the rate of heat generation of the heater; and determining means for determining an abnormality of metering if the average value of the rate of heat generation by the heater deviates from the allowable range.

19. A monitoring device for an injection molding machine according to claim 18, wherein said detecting means detects the rate of heat generation by the heater based on ON time period of the heater per unit time.

20. A monitoring device for an injection molding machine according to claim 18, wherein said detecting means detects the rate of heat generation by the heater based on electric power supplied to the heater per unit time.

* * * * *